United States Patent [19]

Argyle

[11] 4,318,083

[45] Mar. 2, 1982

[54] APPARATUS FOR PATTERN RECOGNITION

[75] Inventor: Percy E. Argyle, Penticton, Canada

[73] Assignee: Canadian Patents and Development Limited, Ottawa, Canada

[21] Appl. No.: 140,300

[22] Filed: Apr. 14, 1980

[30] Foreign Application Priority Data

Jun. 29, 1979 [CA] Canada ................................. 330864

[51] Int. Cl.³ ............................................ G06K 9/64
[52] U.S. Cl. ................... 340/146.3 F; 340/146.3 MA
[58] Field of Search ............. 340/146.3 F, 146.3 MA, 340/146.3 R, 146.3 Q, 146.3 AQ

[56] References Cited

U.S. PATENT DOCUMENTS

| | | | |
|---|---|---|---|
| 3,184,711 | 5/1965 | Taylor | 340/146.3 MA |
| 3,492,647 | 1/1970 | Otten et al. | 340/146.3 R |
| 3,509,533 | 4/1970 | Bieser et al. | 340/146.3 R |
| 3,525,982 | 8/1970 | Cooreman et al. | 340/146.3 R |
| 3,582,885 | 6/1971 | Dietrich et al. | 340/146.3 MA |
| 3,701,095 | 10/1972 | Yamaguchi et al. | 340/146.3 MA |
| 3,964,021 | 6/1976 | Tamches | 340/146.3 MA |
| 4,218,673 | 8/1980 | Yoshida | 340/146.3 MA |

OTHER PUBLICATIONS

Muller, "A Parallel Processing Model For . . . The Brain," *Pattern Recognition*, vol. 8, Jan. 1976, pp. 47–52.
Takagi, "Experiments of Pattern Discriminating System Using Neural Cell Models," *IEEE Trans. On Systems, Man, Cybernetics*, Mar. 1975, pp. 276–278.

*Primary Examiner*—Leo H. Boudreau
*Attorney, Agent, or Firm*—James R. Hughes

[57] ABSTRACT

Apparatus useful in pattern recognition comprising a two-dimensional lattice array of nodal points, said points being occupied by summing amplifiers having positive and negative input terminals, and output terminals, a corresponding input array of points carrying voltage levels, said points being representative of a two-dimensional array of pixels the pattern of which is to be analyzed, said pattern being a member of a set of patterns characterized by an archetypal pattern, electrical connections from the input array of voltage points via resistors to the inputs of the summing amplifiers, the connections being made in a predetermined pattern and the conductance values of the resistors being set by computational procedures such that a prescribed set of input patterns of pixels is formed into output patterns at the output of the amplifiers that are analysable as to correlation between output array patterns and the archetypal pattern for the prescribed set, and correlation means and discrimination means for analyzing said output patterns.

2 Claims, 10 Drawing Figures

APPARATUS FOR PATTERN RECOGNITION

This invention relates to an electronic device for pattern recognition and pattern manipulation.

Pattern recognition comes easily to humans who are able, every minute of their waking lives, to classify correctly the many objects around them. The brain, by some unknown process, extracts their identifying features of the pattern, or image, that a seen object makes to the eyes. These features have been met before, when the observer first saw the object and learned to classify it. The brain is able to repeat earlier successes in instant recognition even though the present object is seen in a novel aspect. The other senses—hearing, touch, smell, etc.—also provide patterns of information and these too are recognized at once. Clearly pattern recognition is not a problem for humans.

As soon as the general purpose electronic digital computer became a practical, reliable device, it was thought that it would soon be programmed to achieved pattern recognition. Thus pattern recognition became a problem for machines and that problem is unsolved.

A quantitatively simple kind of pattern recognition is that of identifying an alphabetic character regardless of its font or style of type. Humans ordinarily have no difficulty recognizing a letter of the alphabet even if it is crudely hand-drawn. This ability is called character recognition. Electric recognition systems have been developed, but they solve only the simplest problems. Machines to read postal addresses on letters are complex devices lacking elegance or efficiency and they are not widely used.

It is therefore an object of the invention to provide a simple, efficient device useful in pattern recognition systems.

This and other objects of the invention are achieved by apparatus useful in pattern recognition comprising a two-dimensional lattice array of nodal points, said points being occupied by summing amplifiers having positive and negative input terminals, and output terminals, a corresponding input array of points carrying voltage levels, said points being representative of a two-dimensional array of pixels the pattern of which is to be analyzed, said pattern being a member of a set of patterns characterized by an archetypal pattern, electrical connections from the input array of voltage points via resistors to the inputs of the summing amplifiers, the connections being made in a predetermined pattern and the conductance values of the resistors being set by computational procedures such that a prescribed set of input patterns of pixels is formed into output patterns at the output of the amplifiers that are analysible as to correlation between output patterns and the archetypal pattern for the prescribed set, and correlation means and discrimination means for analyzing said output patterns.

In drawings which illustrate an embodiment of the invention.

For purposes of the following description of the invention, a pattern is defined to be a finite array of pixel values. Although the array may be amorphous it usually comprises a regular lattice of nodal points. In the electronic representation of a pattern the pixel values occur as nodal voltages or currents. The pattern may be any number of dimensions but usually it has two. The lattice may have any possible regular geometric form but usually it is rectangular, triangular or hexagonal. In the present description a pattern is taken to be a 2-dimensional rectangular array of pixel values of size A×B represented by an A×B lattice of nodal voltages. It should be pointed out that the dimensionality of a pattern is primarily a mathematical concept employed as an aid to concise description and that the physical representation of an n-dimensional pattern need not require its embodiment in a physical space of n dimensions.

The invention described below is an electronic device for pattern recognition and pattern manipulation and for convenience is called a "transvecter" and its operation is referred to as "transvecting".

Figures 1, 2, 3:
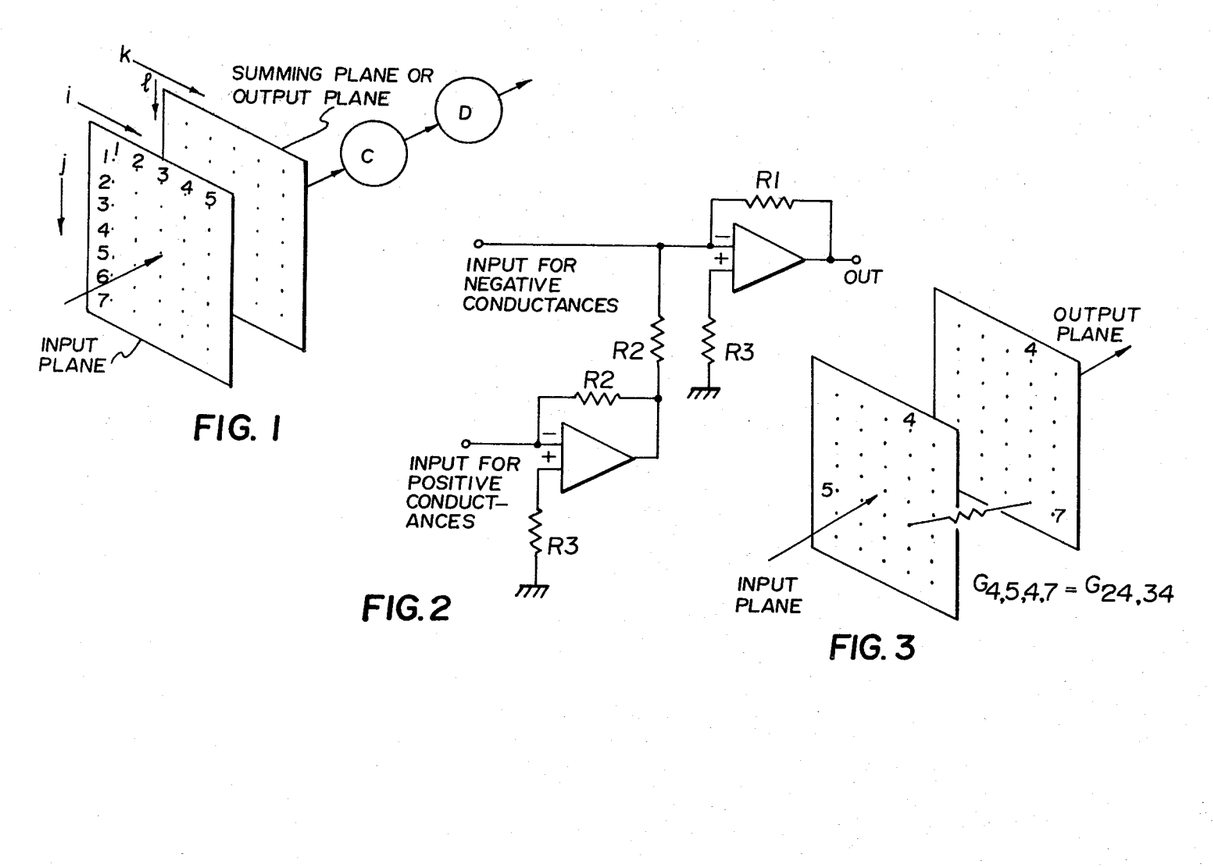
FIG. 1, is a 5×7 transvector shown without interconnections between the two planes.
FIG. 2 is a typical summing node, or amplifier.
FIG. 3 shows how the general interconnection $G_{i,j,k,l}$ is made.

FIG. 1 illustrates a 5×7 transvecter without interconnections. Each dot in the input plane represents an input terminal for a pixel voltage. Dots in the output plane represent summing amplifiers. A possible form of the summing amplifier is shown in FIG. 2.

Each input terminal is specified by its coordinate values (i,j) where $1 \leq i \leq A$ and $1 \leq j \leq B$. Similarly, the nodal point occupied by an amplifier is represented by its coordinates (k,l). An input pattern consisting of an A×B array of nodal voltages causes currents to flow through finite conductance links to nodes in the output plane. The output pattern is another A×B array of voltages. Each amplifier in effect produces an output voltage that is proportional to the algebraic sum of the currents entering its differential terminals through the conductance links.

It is convenient to express the conductance values in a 4-dimensional matrix, the G matrix. The general conductance is $G_{i,j,k,l}$ where i and j are the coordinates of a pixel in the input plane and k,l are those of a summing amplifier in the output plane. That is, the input pixel, (i,j) is connected to the amplifier, (k,l) by conductance $G_{i,j,k,l}$ as shown in FIG. 3.

The G matrix may be displayed in two dimensions as $G_{m,n}$ where $$m = i + A(j-1) \text{ and}$$

$$n = k + A(l-1)$$

This shorter notation is also useful in expressing the transvection formula:

$$V_n = R \sum_{m=1}^{A \times B} V_m G_{m,n}.$$

where $V_n$ is the output voltage at the n-th amplifier and $V_m$ is the input voltage at the m-th pixel. R is the transresistance of the amplifier.

In practice, the average parallelled value of all conductances connected to an amplifier's inputs, $\overline{G}$, is very approximately equal to $\pm 1/R$ and therefore the amplifier's gain is very roughly $\pm 1$. R is taken to be positive but the G's and $\overline{G}$ may have either sign.

Clearly, if all conductances $G_{m,n}$, m=n, are set to 1/R and all conductances $G_{m,n}$, m≠n, are set to zero, the input pattern is transmitted unaltered to the output plane. This form of the G matrix is called the repeating form.

It is clear that it will be possible for each input pixel, with the help of a suitable G matrix, to communicate with every node in the output plane. Thus an arbitrarily specified output pattern can be generated by any single non-zero input pixel, and therefore by any arbitrarily specified input pattern.

However, it is not obvious that a set of n arbitrary input patterns can be transvected into another set of n arbitrary output patterns, by means of a single, specially computed G matrix. Nevertheless, this property of the transvecter has been demonstrated through numerous computer simulations of the transvection process. This powerful capacity of a G matrix to store multiple arbitrary transformations endows the transvecter with great promise for pattern recognition, and for other tasks in pattern manipulation.

Conductance logic may be real, integer, ternary or binary. In the absence of any restrictions on the values that may be taken by the elements of the G matrix the conductance logic is said to be real. Real logic is powerful in the sense that exactly applied real logic leads to precision in the manipulation of patterns, but its implementation in a physical device is very demanding of manufacturing tolerances. It has been used only to determine, by computer simulation, the degree of precision that is necessary in the fabrication of integer values of conductance. Integer logic permits the matrix elements to take on only the small integer values, $0, \pm 1, \pm 2, \ldots$ etc. Ternary logic restricts the matrix elements to the 3 values $-1, 0$ and $1$. Although somewhat weaker than integer logic it is of interest because it demands only one value of conductance in a fabricated device. A negative conductance link is realized by connecting a positive conductance link to the minus terminal of the amplifier of the target node. Finally, binary logic, comprising conductance values of 0 and 1, has the small advantage that the summing amplifiers need not have differential inputs, but the logic is weak and has been little considered.

Because there is no known analytic method of determining the G matrix required to perform a specific pattern manipulation task it is necessary to generate it by trial and error processes in computer simulations of the transvecter.

Figure 4:
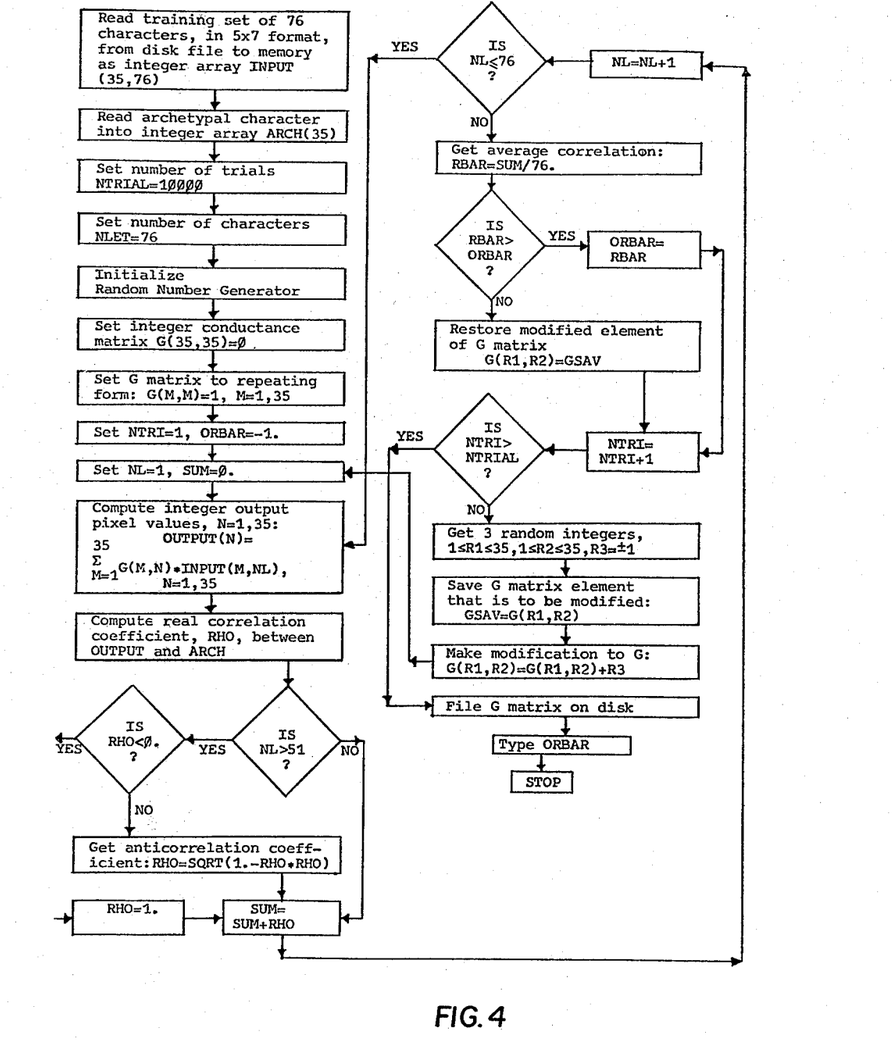
FIG. 4 is a flow chart for a computer program to simulate the transvecter and develop its connection matrix.

The flow chart shown in FIG. 4 outlines the computer program for determining the connection diagram, or G matrix, for the transvecter. For concreteness the magnitudes of various parameters have been set to values that have actually been used. The character set consists of 51 different fonts of the letter A plus the 25 other upper case letters each in a standard font. Ten thousand trial changes are made in the G matrix.

The correlation coefficient is defined as $$RHO = \frac{n\Sigma xy - \Sigma x \cdot \Sigma y}{\sqrt{(n\Sigma x^2 - (\Sigma x)^2) \cdot (n\Sigma y^2 - (\Sigma y)^2)}}$$

where x=OUTPUT (N), y=ARCH (N), n=34 and the summations are over N=1 to 35.

Each font of A (NL=1, 2 . . . 51) must be transformed so that its OUTPUT correlates well with ARCH (RHO≈1.) The guard characters (NL=52,53 . . . 76) must be transformed to patterns that are uncorrelated with ARCH (RHO≈φ.) Therefor the quantity $\sqrt{(1.-RHO*RHO)}$ is substituted for RHO. However, if RHO<φ. it is replaced by 1. as it is not required that OUTPUT for a guard letter should correlate negatively with ARCH.

LIST OF VARIABLE NAMES
In order of appearance in FIG. 4:

| NAME | EXPLANATION |
|---|---|
| INPUT | Training set array |
| ARCH | Archetypal character array |
| NTRIAL | Number of trials to be made |
| NLET | Number of letters in training set |
| G | Conductance matrix |
| NTRI | Ordinal of current trial |
| ORBAR | Old value of RBAR (mean RHO) |
| NL | Ordinal of current letter |
| SUM | Accumulating sum of RHO's |
| OUTPUT | Transformed pattern of current character |
| RHO | Correlation coefficient |
| R1, R2, R3, | Pseudo-random integers |
| RBAR | Mean value of RHO for 76 characters, for one trial G matrix |
| GSAV | Temporary storage of a G matrix element. |

Figure 5:
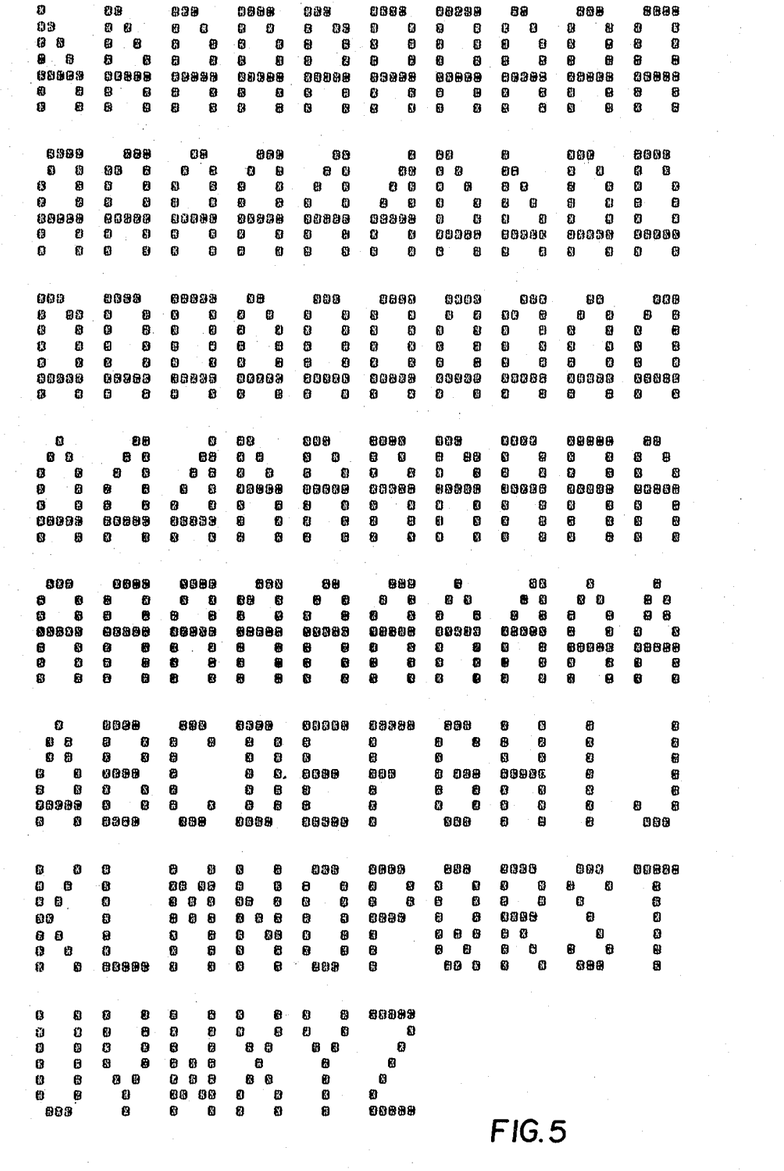
FIG. 5 shows a typical training set (input set) of characters for a 5×7 transvecter.

The simulation, which is straightforward, will be described with reference to a concrete case of character recognition. The training set of input characters to be recognized consists of 51 fonts of the upper case letter A and the other 25 upper case letters, rendered in a 5×7 pixel matrix. This set is displayed in FIG. 5. The output set was specified to be a single letter, the archetypal A (the 49th character in FIG. 5). It is required to find an integer G matrix that would transvect each of the 51 input A's, but only these into the standard or archetypal A.

The trial and error simulation was begun with the G matrix set to its repeating form. The 25 other upper case letters of the alphabet (52, 53, . . . 76) of FIG. 5 were included in the input set to guard against false positives. The computer program then transvected each intput character through 5×7 transvecter by means of the transvection formula. Each resulting output character was then compared with the archetypal character by computation of the product-moment correlation coefficient between them ($\rho_n$, n=1, 2, . . . 51). These 51 coefficients, along with $\sqrt{1-\rho_n^2}$ (serving as an anticorrelation function, n=52,53 . . . 76), were then averaged and stored as $\rho_{old}$. These first coefficients are shown in the following Table I:

TABLE I 0.539 0.485 0.777 0.727 0.727 0.612 0.563 0.830 0.662 0.612
0.727 0.727 0.830 0.777 0.485 0.539 0.141 0.194 0.433 0.382
0.382 0.266 0.215 0.485 0.318 0.266 0.382 0.382 0.485 0.433
0.655 0.141 0.194 0.141 0.433 0.382 0.382 0.266 0.215 0.485
0.318 0.266 0.382 0.382 0.485 0.433 0.655 0.141 1.000 0.770

TABLE I-continued 0.424–0.017 0.007–0.026–0.141 0.007 0.026 0.256–0.172 0.054
0.187 0.120 0.433 0.370 0.194 0.017 0.256 0.089–0.231–0.374
0.132 0.062 0.318 0.007–0.453–0.215

Figure 6:
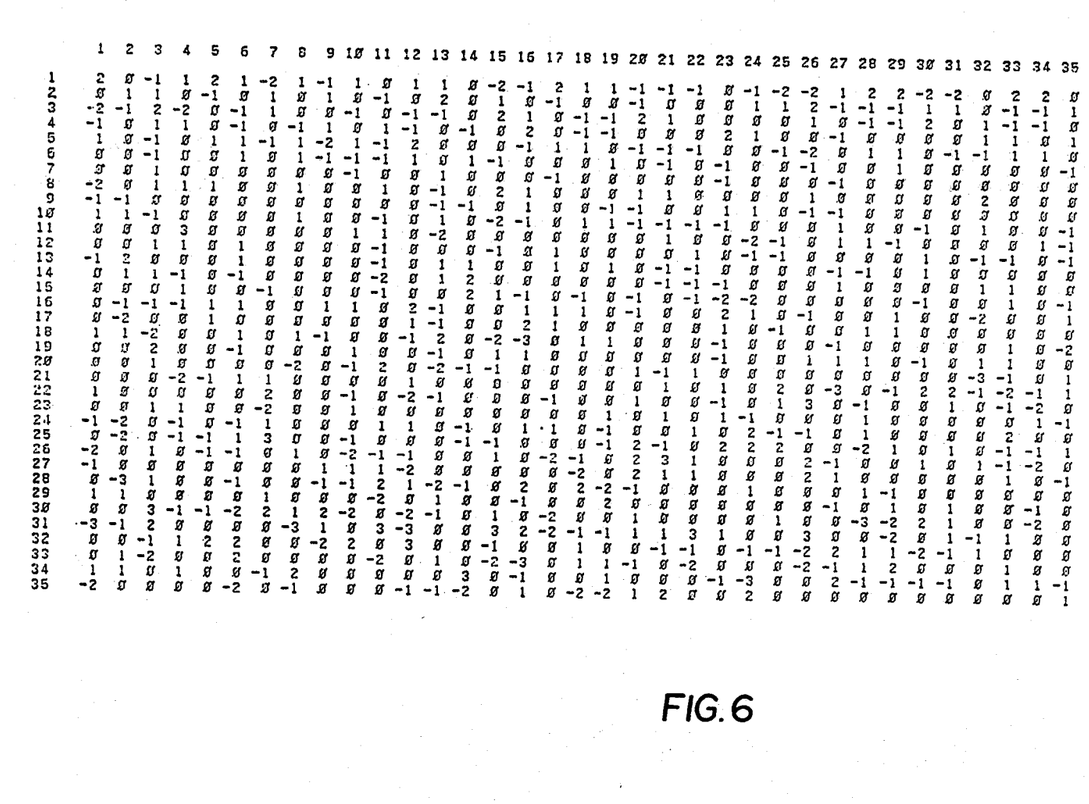
FIG. 6 is a typical G matrix in its 2-dimensional form.
Figure 7:
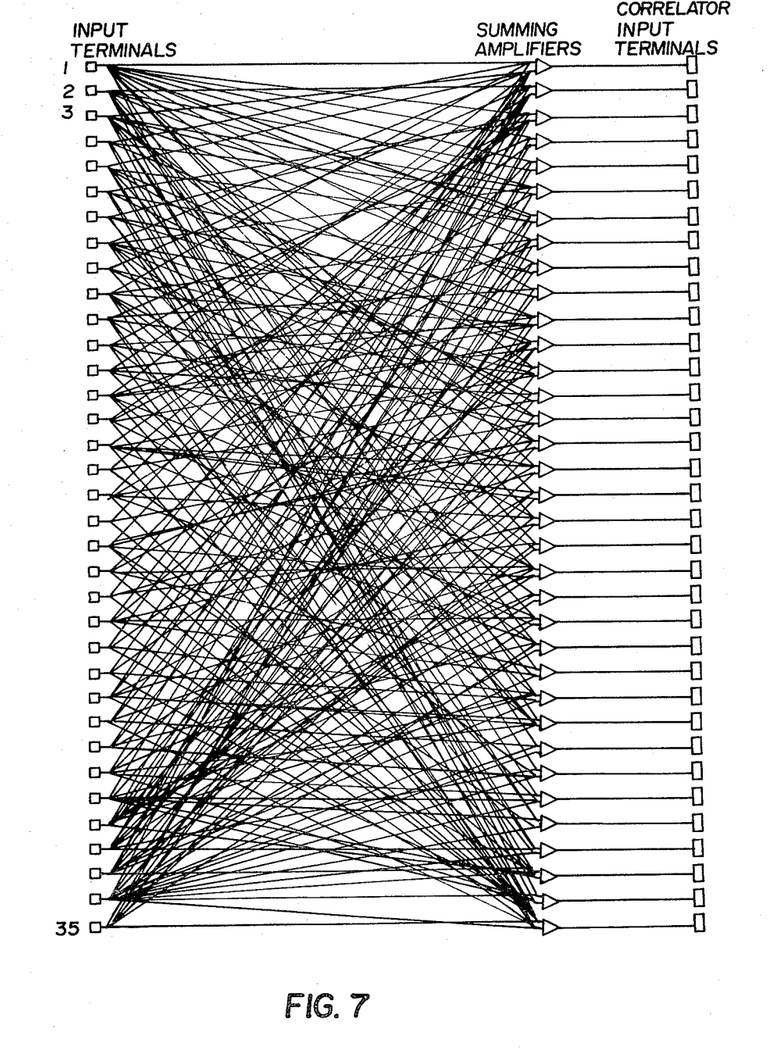
FIG. 7 illustrates the interconnection pattern specified by the G matrix of FIG. 6.

It is seen that many of them are very small, even for the first 51 characters, indicating little resemblance between some of the unaltered (repeated) input characters and the standard symbol. Then one of the elements of the G matrix was changed, the choice of both the element and its new value being made by use of the computer system pseudorandom number generator. The 76 input characters were transvected again, and a new value of the mean correlation coefficient, $\rho_{new}$, was computed. In each such iteration the old and new values of correlation were compared. If $\rho_{new}$ exceeded $\rho_{old}$ the altered G matrix was retained for the next random trial. Otherwise the matrix was restored to its pretrial form and the next random trial was made. At the outset about one quarter of all trials were successful, and $\rho$ increased rapidly. Subsequently fewer trials succeeded and it was necessary to make several thousand trials to achieve an average $\rho$ value above 0.97. FIG. 6 displays a G matrix obtained by this process, and the actual wiring diagram corresponding to it is shown in FIG. 7, without, however, indicating the numerical values of the conductance links. The conductance of each link may be read out of the G matrix of FIG. 7.

This device transvects all 51 A's of the training set to the archetypal A at the 97% level of correlation. The 25 other characters of the training set fail to correlate more than 20% with the archetypal A. The 76 output correlation coefficients are shown in the following Table II:

TABLE II 0.983 0.986 0.989 0.985 0.987 0.987 0.987 0.987 0.981 0.991
0.987 0.988 0.982 0.989 0.987 0.981 0.986 0.983 0.989 0.985
0.987 0.987 0.987 0.987 0.981 0.991 0.987 0.988 0.982 0.989
0.985 0.987 0.981 0.979 0.984 0.979 0.979 0.984 0.975 0.982
0.976 0.987 0.981 0.981 0.977 0.085 0.980 0.978 0.985 0.980
0.980–0.326–00.41 0.167–0.547 0.168 0.144 0.164–0.457–0.613
–0.154–0.562 0.154 0.151 0.189 0.072 0.185 0.189–0.364–0.688
–0.710–0.736 0.083–0.249–0.904–0.592

Figure 8:
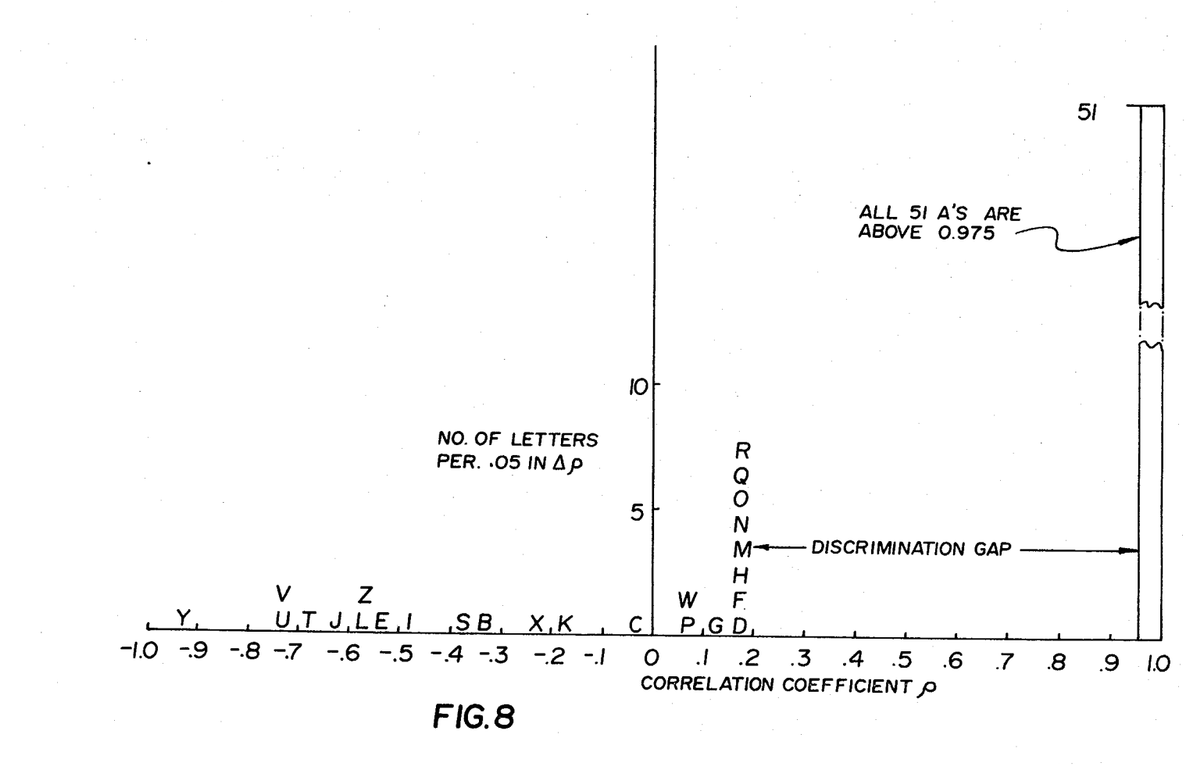
FIG. 8 is a graph of the distribution of correlation coefficients after transvection, showing the wide discrimination gap between A's and non-A's.

Their distribution is graphed in FIG. 8. It is seen that all input A's match the arthetype above the 97% level whereas all non-A's fall below 20%. Thus it is easy for the correlator and discriminator to separate A,s from non-A's.

The actual pixel output voltages for the 76 characters of the training set are displayed in Following Table III.

TABLE III

| | | | | | | |
|---|---|---|---|---|---|---|
| -4-4 5-4-4 | -6-4 7-4-5 | -8-9 7-6-7 | -9-9 9-4-7 | -6-8 5-6-7 | -6-6 7-4-7 | -4-6 5-4-5 |
| -4 5-3 5-4 | -6 7-5 7-6 | -6 7-7 7-8 | -8 7-9 9-8 | -6 7-5 7-8 | -8 7-7 9-8 | -6 5-5 5-6 |
| 6-5-4-5 5 | 8-5-6-5 7 | 8-7-9-7 9 | 10-9-9-9 9 | 6-7-8-7 5 | 8-9-6-7 5 | 6-5-6-7 5 |
| 7-5-4-2 7 | 7-7-4-4 9 | 7-7-8-8 7 | 11-7-9-9 7 | 5-7-6-6 5 | 7-7-7-8-6 7 | 5-5-6-6 5 |
| 7 7 5 6 5 | 7 9 7 8 7 | 9 9 7 6 7 | 9 911 8 7 | 7 7 5 6 7 | 7 7 7 6 7 | 5 5 7 6 5 |
| 5-4-3-3 4 | 9-2-5-5 6 | 7-6-7-7 8 | 7-8-7-7 8 | 7-4-7-7 6 | 9-4-7-7 6 | 5-4-5-5 6 |
| 5-4-3-3 5 | 7-6-7-5 9 | 7-9-9-7 7 | 7-8-7-7 9 | 7-8-9-7 5 | 7-6-7-7 7 | 5-8-5-5 7 |
| -9-8 9-8-9 | -9-6 9-6 9 | -8-6 7-6-9 | -8-611-6-9 | -8-8 7-6-7 | -9-811-6-9 | -8-8 9-6-7 |
| -811-9 9-9 | -911-911-9 | -8 9-7 7-8 | -9 9-9 9-8 | -8 7-5 9 | -9 9-911-9 | -9 7-9 7-8 |
| 8-9-9-713 | 8-9-8-7 9 | 6-7-8-7 9 | 8-9-6-911 | 8-7-9-7 7 | 12-9-9-9 9 | 10-9-9-9 9 |
| 9-9-9-9 9 | 9-9-9-8 9 | 7-9-8-8 9 | 7-9-8-9 7 | 7-9-8-8 9 | 9-9-9-911 | 7-9-8-9 9 |
| 1111 7 811 | 9 9 7 811 | 7 7 7 8 9 | 9 7 7 8 9 | 7 7 5 6 7 | 11 9 7 6 9 | 9 7 7 6 7 |
| 11-8-9-912 | 13-6-9-910 | 9-6-9-910 | 11-8-9-910 | 5-6-7-7 8 | 11-6-9-9 8 | 7-6-7-9 8 |
| 11-9-9-9 7 | 11-6-9-9 7 | 9-8-9-9 7 | 9-8-9-9 7 | 7-8-7-7 5 | 9-6-9-9 7 | 7-8-7-7 7 |
| -8-6 7-4-5 | -6-6 3-8-7 | -6-4 7-4-5 | -4-4 5-4-5 | -8-9 7-6-7 | -9-9 9-4-7 | -6-8 5-6-7 |
| -6 5-7 7-6 | -6 5-7 3-8 | -6 7-5 7-6 | -4 5-3 5-4 | -6 7-7 7-8 | -8 7-9 9-8 | -6 7-5 7-8 |
| 8-7-8-9 7 | 4-7-6-7 5 | 8-5-6-5 7 | 6-5-4-5 5 | 8-7-9-7 9 | 10-9-9-9 9 | 6-7-8-7 5 |
| 7-5-6-8 7 | 5-5-6-6 5 | 7-7-4-4 9 | 7-5-4-2 7 | 7-7-8-8 7 | 11-7-9-9 7 | 5-7-6-6 5 |
| 7 9 9 8 7 | 3 5 5 8 7 | 7 9 7 8 7 | 7 7 5 6 5 | 9 9 7 6 7 | 9 911 8 7 | 7 7 5 6 7 |
| 7-6-7-5 6 | 5-8-7-5 6 | 9-2-5-5 6 | 5-4-3-3 4 | 7-6-6-6 8 | 7-8-7-7 8 | 7-4-4-4 6 |
| 7-8-7-7 7 | 7-8-7-7 5 | 7-6-7-5 9 | 5-4-3-3 5 | 7-9-9-7 7 | 7-8-7-7 9 | 7-8-9-75 |
| -6-6 7-4-7 | -4-6 5-4-5 | -9-9 9-8-9 | -9-6 9-6-9 | -8-6 7-6-9 | -8-611-6-9 | -8-8 7-6-7 |
| -8 7-7 9-8 | -6 5-5 5-6 | -811-9 9-9 | -911-911-9 | -8 9-7 7-8 | -9 9-9 9-8 | -8 7-7 5-9 |
| 8-9-6-7 5 | 6-5-6-7 5 | 8-9-9-713 | 8-9-8-7 9 | 6-7-8-7 9 | 8-9-6-911 | 8-7-9-7 7 |
| 7-7-8-6 7 | 5-5-6-6 5 | 9-9-9-9 9 | 9-9-9-9 9 | 7-9-8-8 7 | 7-9-8-8 9 | 7-9-8-8 9 |
| 7 7 7 6 7 | 5 5 7 6 5 | 1111 7 811 | 9 9 7 811 | 7 7 7 8 9 | 9 7 7 8 9 | 7 7 5 6 7 |
| 9-4-7-7 6 | 5-4-5-5 6 | 11-8-9-912 | 13-6-9-910 | 9-6-9-910 | 11-8-9-910 | 5-6-7-7 8 |
| 7-6-7-7 7 | 5-8-5-5 7 | 11-9-9-9 7 | 11-6-9-9 7 | 9-8-9-9 7 | 9-8-9-9 9 | 7-8-7-7 5 |
| -9-811-6-9 | -8-8 9-6-7 | -9-911-8-9 | -8-6 7-4-5 | -6-6 3-8-7 | -4-2 5-4-3 | -6-8 5-6-5 |
| -9 9-911-9 | -9 7-9 7-8 | -9 9-9 9-9 | -6 5-7 7-6 | -6 5-7 3-8 | -4 5-3 5-4 | -4 5-5 5-6 |
| 12-9-9-9 9 | 10-9-9-9 9 | 12-9-9-913 | 8-7-8-9 7 | 4-7-6-7 5 | 6-3-4-3 5 | 6-5-8-5 7 |
| 9-9-9-911 | 7-9-8-9 9 | 9-9-9-911 | 7-5-6-8 7 | 5-5-6-6 5 | 5-5-2-2 7 | 5-5-6-6 5 |
| 11 9 7 6 9 | 9 7 7 6 7 | 1311 7 6 9 | 7 9 9 8 7 | 3 5 5 8 7 | 5 7 5 6 5 | 7 7 5 4 5 |
| 11-6-9-9 8 | 7-6-7-9 8 | 9-8-9-910 | 7-6-7-5 6 | 5-8-7-5 6 | 7-2-3-3 4 | 5-6-5-5-6 |
| 9-6-9-9 7 | 7-8-7-7 7 | 9-9-9-9 7 | 7-8-7-7 7 | 7-8-7-7 5 | 5-4-5-3 7 | 5-8-7-5 5 |
| -8-8 7-4-5 | -4-6 3-6-5 | -4-4 5-4-5 | -2-4 3-4-3 | -9-8 7-8-9 | -8-4 7-6-9 | -6-4 5-6-7 |
| -6 5-7 7-6 | -4 5-3 5-6 | -6 5-5 7-6 | -4 3-3 3-4 | -6 9-7 7-8 | -8 9-7 9-8 | -6 7-5 5-6 |
| 8-7-8-7 7 | 4-5-6-5 3 | 6-7-4-5 3 | 4-3-3-5 3 | 6-7-9-511 | 6-9-6-5 7 | 4-5-6-5 7 |
| 9-5-8-8 5 | 3-5-4-4 3 | 5-5-6-4 5 | 3-3-4-4 3 | 7-9-8-8 7 | 7-9-8-6 7 | 5-7-6-6 5 |
| 7 7 9 6 5 | 5 5 3 4 5 | 5 5 5 4 5 | 3 3 5 4 3 | 9 9 5 6 9 | 7 7 5 6 9 | 5 5 5 6 7 |
| 5-8-5-5 6 | 5-4-5-5 4 | 7-4-5-5 4 | 3-4-3-3 4 | 9-8-9-910 | 11-6-9-9 8 | 7-6-7-7 8 |
| 5-6-5-5 7 | 5-6-7-5 3 | 5-4-5-5 5 | 3-6-3-3 5 | 9-8-9-9 5 | 9-4-9-9 5 | 7-6-7-7 5 |
| -6-4 9-6-7 | -6-6 5-6-5 | -8-6 9-6-7 | -6-6 7-6-5 | -9-9 9-8-7 | -6-4 5-4-3 | -9-911-8-9 |
| -8 7-7 7-6 | -6 5-5 3-8 | -9 7-9 9-8 | -8 5-7 5-6 | -8 7-9 7-8 | -4 3-5 5-4 | -9 9-9 9-9 |
| 6-7-4-7 9 | 6-5-8-5 5 | 10-9-8-7 7 | 8-7-8-7 7 | 10-9-9-711 | 6-5-6-7 5 | 12-9-9-913 |
| 5-9-6-8 5 | 5-7-6-6 7 | 7-9-8-8 9 | 5-7-6-8 7 | 7-9-8-9 9 | 5-3-4-6 3 | 9-9-9-911 |
| 7 5 5 6 7 | 5 5 3 4 5 | 9 7 5 4 7 | 7 5 5 4 5 | 11 9 5 4 7 | 5 7 7 6 5 | 1311 7 6 9 |
| 9-8-7-9 8 | 3-6-5-5 6 | 9-6-7-9 6 | 5-6-5-7 6 | 7-8-7-9 8 | 5-6-5-3 4 | 9-8-9-910 |
| 7-6-7-7 7 | 5-6-5-5 3 | 7-4-7-7 5 | 5-6-5-5 5 | 7-8-9-7 5 | 5-6-5-5 5 | 9-9-9-9 7 |
| -9-915-9-9 | -9-915-9-9 | 2 0-3 0-1 | 2 8-5-2-5 | 4 0 5 2 1 | -2 2-9 2 5 | 0-2-7-2 1 |

TABLE III-continued

| | | | | | | |
|---|---|---|---|---|---|---|
| -9 11-9 9-9 | -9 11-9 9-9 | 6 3 5 3 0 | 2 3 7 5-2 | 4 5-5 7-4 | 6-7 1-5 8 | 4-5-1-1 2 |
| 6-9-8-9 9 | 6-9-8-9 9 | -2 1 4 7-1 | -6 5 2 5-1 | 4-9 4 3-3 | 0 7 2 1 1 | 4 3 4-1 5 |
| 11-9-8-913 | 11-9-8-913 | -5-5 2 4-1 | -5-7 2 4-3 | -3-5-4 0 5 | -1 1 0 0-3 | 3 1 0 0-3 |
| 913-912 9 | 913 912 9 | 1-3 3-8 3 | 3-5 3-6 5 | -7 1-1-8 1 | 7-1 5-4-5 | 5 5 9 0-3 |
| 9-8-9-914 | 9-8-9-914 | -1 2-3-1-2 | -5 0-7-5 6 | 7 8-9-1-4 | -5 0 9 3-2 | 1-8 5-1 6 |
| 9-9-9-9 9 | 9-9-9-9 9 | 1 4 1-3-1 | 1 4-9-5 3 | -1-2-1-3 1 | -5 0 3 5 3 | -1-4-3 3 3 |
| 4 6-3-4-7 | 4-4-5-2-1 | 0 4-7-2-1 | 10 6-9 0-3 | -2 0-9 2 3 | 0 4-9 4 3 | 0 2-7-2-3 |
| 4 9 5 3-4 | 0-1-1-1-2 | 2-7 1-3 0 | 4-1 5-3-4 | 4-9-3-3 6 | 8-9-1-3 6 | 4-1-1-1-6 |
| -2 3 0 1-7 | 4 1-6-3-3 | 2-1 4-1 1 | -6 5 2 5-7 | -2 7-2-3 3 | 2 7 0 3-3 | 2-1 0-3-5 |
| -9-7 4 4 3 | -3-1 0 0 1 | -7 3 6 2-3 | -9-5 4 4-1 | 5 5-2 4-5 | -5-1 0 2-3 | -7-3 0 0-1 |
| -1-3 3-2 9 | 1 3 1 0 1 | 1-5-1 0 1 | -7-7-5-8 3 | 7 311 0-5 | 7 1 3-8-3 | -1 1 1 2 3 |
| -3 0-9-3 4 | -3 0 1 1-2 | -3-4 1-1 4 | -9 8-7 3-6 | -7-8 9 5 2 | -9 4 7 3-6 | -7-8-5-1 2 |
| 3 0-9-7 3 | 1-9-1 1 1 | -3 6-3 5-3 | -5-2-3-1 1 | -1-8-3 7 3 | -5-4-4 7 3 | 1-9-3 1 1 |
| 2-4-7-2-3 | 2 4-3-2-7 | 0 0-3 0-1 | -2 4-7 0-5 | -2 2-1 2-1 | 2 8-5-2-5 | 4 6-7 2 3 |
| 2 1-1-1-4 | 4 7 3 5-6 | 0-5-1 3 2 | 4 3-5 1 0 | -4-7-3 3 4 | 0 3 9 1-6 | 4-9 3-5 4 |
| 4 1-2-5-7 | -4 5-2 5-3 | 2-1 4 3 5 | -8 7 0-5-5 | -2-3 4-1 5 | -8-112 3-7 | 0 310-3-1 |
| -7 1 0-2 1 | -7-7 0 2 1 | 3-1-2 2-5 | -5-3-4 2 1 | 3-1-6 4-3 | -9-5 2 4-1 | -7 7 8 2-9 |
| 1 7 1 2-1 | 1-5 3-6 9 | 5 3 1-4-1 | 5-5 7 2 7 | 11 3 3-2-1 | -1-1-5-2-1 | -3-9 3 2-3 |
| -7-2-1-1 2 | -5 0-9-3 4 | 7-4 5-3 0 | -5-6-1 5 2 | 7-6 7-1 0 | 5 2-7-3 4 | -7-6 5 3 2 |
| 1-9-1 1-1 | 3-2-9-7 5 | 1 2-1 1-1 | 5-2-9-5 7 | 3 2-1 1-1 | -3 8-1-5-5 | -7 6 3 9 1 |
| 14 4-9 2 1 | 16-4-9 4 5 | 4 2-7 0-3 | 4 4-5-4-1 | 18 6-9 2 3 | 212-9 0 3 | |
| 12-3 9-5 0 | 6-7 1-7 2 | 2-3-1 1 0 | -6-1 3-3-6 | 8-9 7-9 4 | 0-5 1-5 2 | |
| -6 15-2 7-9 | 213-6-1-9 | 2-5 0-3-5 | -4-9 8-1-5 | -9 912 3-9 | -6-714 3-3 | |
| -9 1 8 8-5 | -9 912 2-9 | -9-3-4 6 5 | -7-3 0 0 1 | -9 914 8-9 | -9-5 0 0-1 | |
| -7-9-1-9 1 | -9-7-7-2-7 | 5 5 3-2 3 | -1 5-9 4-5 | -9-9-7-4-7 | 1-5-5-2-3 | |
| -9 6-1 7-6 | -9 611 9-9 | -1-2-1 1 0 | 1 4-1-1 0 | -9 411 9-6 | 3 6 1 1-6 | |
| -5-8-3 3 1 | -7-9 5 9-1 | 3-9 1 1-3 | -3 0 5-1-5 | -9 0 513-9 | -7 8 5 1 1 | |

Figure 9:
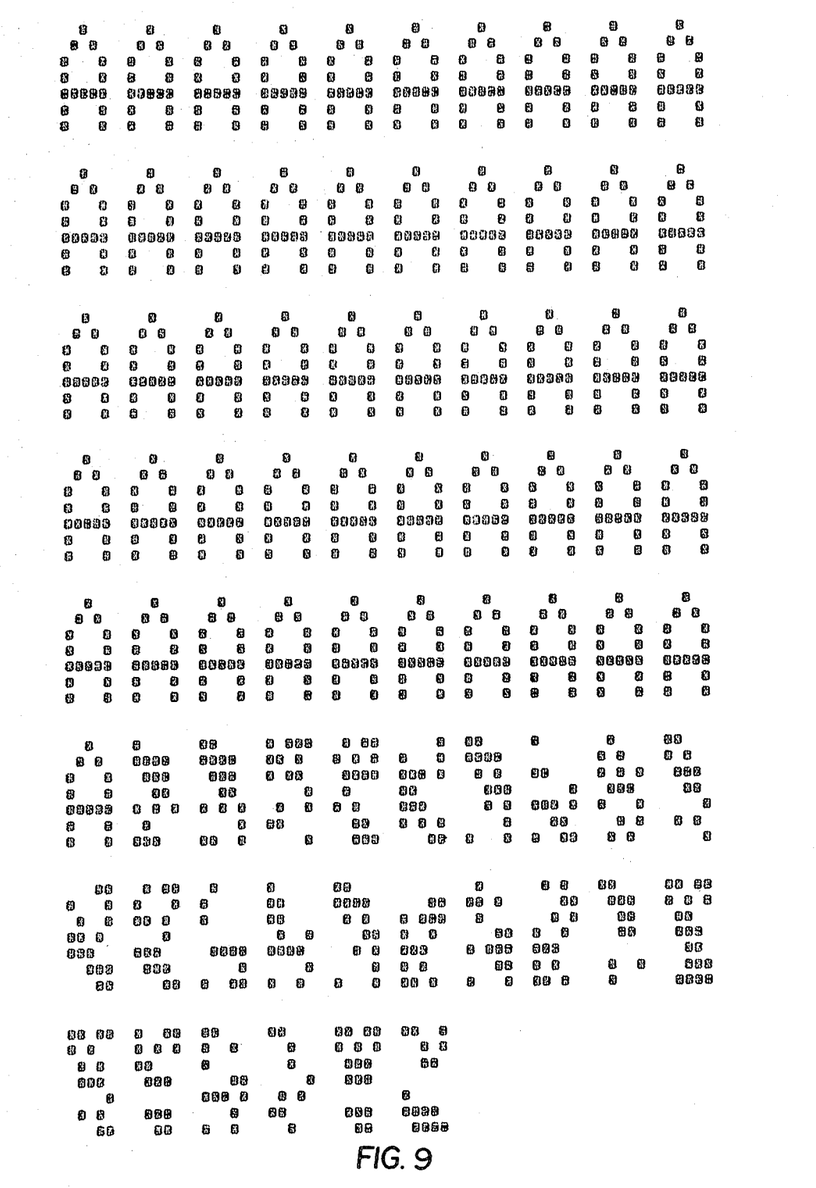
FIG. 9 shows the output patterns represented by positive pixels.

The shapes formed by the positive pixels in this table are illustrated in FIG. 9. It is seen that all 51 A's have precisely the form of the archetype whereas the other 25 letters form meaningless patterns. It is this transformation of input A's closely to the archetypal form that makes subsequent character recognition by correlation and discrimination easy.

If the character to be recognized is available on a 35-wire cable in the 5×7 pixel pattern at suitable voltage levels the 35 nodes in the input plane of the transvecter consist of simple terminals, to which the input cable is then connected. If the input character is in the form of an optical real image it will be convenient to project it in onto a "transducing plane" consisting of a 5×7 grid of photo-sensitive elements with amplifiers if necessary, to provide suitable voltage levels. The transducing plane outputs will then be connected to the corresponding input terminals of the transvecter. Alternatively the input plane of the transvecter may be replaced by the photosensitive plane, which then becomes part of the transvecter.

The 35 summing amplifiers need not be elaborate. The main requirement of them is that any level shifts should affect all amplifiers equally. The largest voltages ever seen at the output terminals have been less than ±20 volts, assuming unit voltage input pixels and unit node-to-node gain. Thus linearity and dynamic range requirements are modest. The conductance links need not be precise. Real logic perturbations of a successful interger G matrix show that normally distributed conductance errors having zero means and 0.1 standard deviation (corresponding to 10% resistor tolerances) depress correlation coefficients about 1%—a tolerable loss.

Whenever a character is transvected the output is either the archetypal form of the input character, or it is meaningless scramble of 35 pixels. These alternative results are easily distinguished by means of a correlator—a device that forms the Pearson product-moment correlation coefficient (or its square) between the output pattern and the archetypal pattern stored in the device. The correlator is followed by a discriminator with a suitable gain and threshold setting so that a recognized character yields, say a 5-volt output, whereas an unrecognized character yields zero output.

Figure 10:
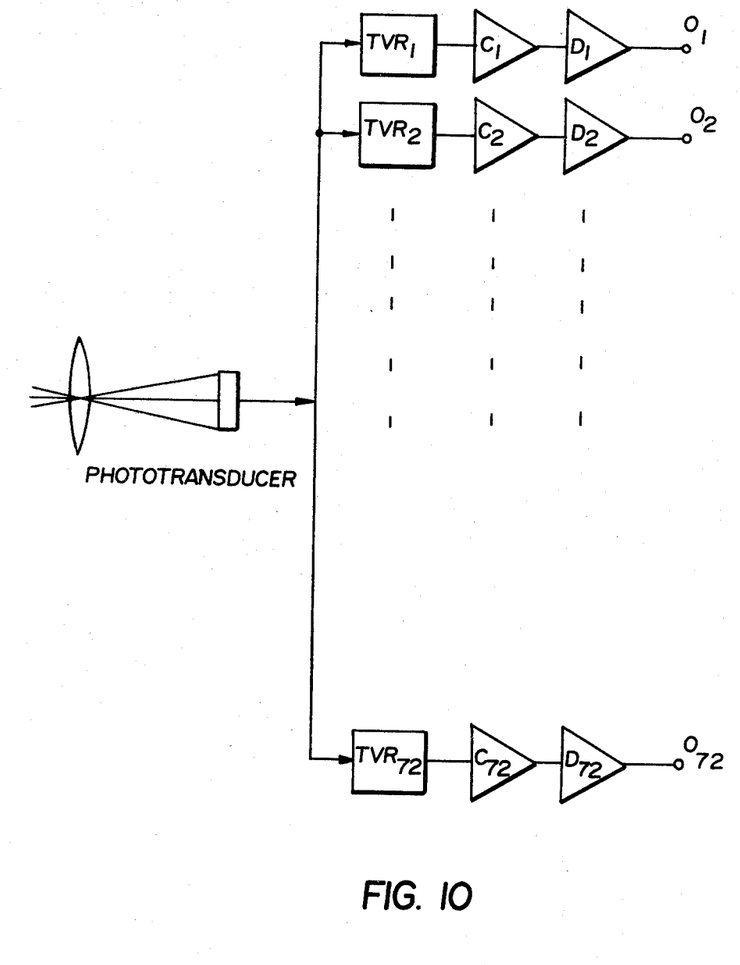
FIG. 10 outlines a possible character recognition system for an extended alphabet of useful characters.

If an extended alphabet of, say 72 symbols (26 upper and 26 lower case letters plus 10 numerals and 10 punctuation marks) is to be recognized in a large variety of fonts it will be convenient to have 72 transvecters, each interconnected according to a G matrix computed for recognition of a different member of the alphabet. The input nodal planes of the 72 devices will be connected in parallel and fed by a single transducing plane that is activated, say, by an optical image of a character projected onto it. Such a system is illustrated in FIG. 10 where TVR=transvecter, C=correlator, D-discriminator and O=output. For each valid character image on the transducer there will be 72 output patterns generated by the transvecters. All but one of these outputs will be nonsense and the meaningful pattern may be detected by the correlation method described above.

If a character image is only momentarily available for projection onto the system transducer of FIG. 10 a pulsed pattern will be input to the 72 transvecters. Provided only that the pulse duration equals or exceeds the level-settling time for the slowest system component, transvection of a valid character will generate a recognition pulse at just one of the 72 discriminator outputs.

If a series of valid character images is swept across the system transducer there will be instants when characters are well placed for recognition. Again, provided only that the dwell time for good framing exceeds the longest level-settling time, a series of recognition pulses will appear at the appropriate discriminator outputs. Inter-pulse noise pixels generated at the transvecter outputs by moving, ill-framed images will not add coherently at the correlators, and the discriminators will reject the correlator outputs. If the greatest settling time is taken to be one microsecond, and the image sweep is horizontal, the recognition rate for close-spaced characters will approach 200 kHz.

I claim:
1. Apparatus useful for pattern recognition comprising:

(a) at least one two-dimensional array of nodal points, said points being occupied by summing means having input terminals and output terminals,
(b) a corresponding input array of points carrying voltage levels, said points being representative of a two-dimensional array of pixels the pattern of which is to be analysed,
(c) electrical connections from the input array of voltage points via resistors to the inputs of the summing means said connections being made in a predetermined pattern and the conductance value of the resistors being set by computational procedures such that a set of arbitrary input patterns of pixels characterized by an archetypal pattern is formed into output patterns that are analysable as to correlation between output patterns and the archetypal pattern, and
(d) means for analysing said output patterns by correlation discrimination.

2. Apparatus useful for pattern recognition as in claim 1 wherein the summing means are summing amplifiers having positive and negative input terminals and output terminals.

* * * * *